US010063534B2

(12) United States Patent
Weerasuriya et al.

(10) Patent No.: US 10,063,534 B2
(45) Date of Patent: *Aug. 28, 2018

(54) SYSTEM AND METHOD FOR PROVIDING SECURITY MONITORING

(71) Applicant: Datawatch Systems, Inc., Bethesda, MD (US)

(72) Inventors: Para Weerasuriya, Olney, MD (US); Kenny Reed, Bethesda, MD (US)

(73) Assignee: DATAWATCH SYSTEMS, INC., Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,104

(22) Filed: Nov. 21, 2017

(65) Prior Publication Data
US 2018/0083946 A1 Mar. 22, 2018

Related U.S. Application Data

(63) Continuation of application No. 14/930,958, filed on Nov. 3, 2015, now Pat. No. 9,843,570.

(60) Provisional application No. 62/075,664, filed on Nov. 5, 2014.

(51) Int. Cl.
*H04L 29/06* (2006.01)
*H04L 29/08* (2006.01)
(52) U.S. Cl.
CPC .............. *H04L 63/08* (2013.01); *H04L 67/12* (2013.01); *H04L 63/0272* (2013.01)

(58) Field of Classification Search
CPC ....... H04L 63/08; H04L 63/12; H04L 63/107; H04L 63/0272; H04L 67/12; G06F 21/30; G06F 21/31; G06F 21/50; G06F 21/60; G06F 21/78
USPC .............................. 726/2–7, 26–30; 713/182
See application file for complete search history.

(56) References Cited

U.S. PATENT DOCUMENTS

| | | | |
|---|---|---|---|
| 6,760,903 B1 | 7/2004 | Morshed et al. | |
| 7,123,974 B1 * | 10/2006 | Hamilton | G05B 19/4063 700/87 |
| 7,243,131 B1 | 7/2007 | Inoue | |
| 7,577,807 B2 | 8/2009 | Rowan et al. | |
| 7,849,142 B2 | 12/2010 | Clegg et al. | |
| 7,873,695 B2 | 1/2011 | Clegg et al. | |
| 8,160,129 B2 | 4/2012 | Hirose | |
| 8,307,214 B2 * | 11/2012 | Lundberg | G06F 21/83 713/182 |
| 8,665,759 B2 * | 3/2014 | Jang | H04L 12/1813 370/260 |
| 8,780,199 B2 | 7/2014 | Mimar | |
| 8,918,854 B1 | 12/2014 | Giobbi | |
| 9,265,001 B1 * | 2/2016 | Tannenbaum | H04W 52/0235 |
| 9,843,570 B2 * | 12/2017 | Weerasuriya | H04L 63/08 |

* cited by examiner

*Primary Examiner* — Hosuk Song
(74) *Attorney, Agent, or Firm* — Duane Morris LLP

(57) ABSTRACT

The present disclosure describes systems and methods for processing security sensor data that enhances the ability of a user to quickly and efficiently review portions of the sensor data streams.

27 Claims, 9 Drawing Sheets

SYSTEM AND METHOD FOR PROVIDING SECURITY MONITORING

RELATED AND CO-PENDING APPLICATIONS

This application is a continuation of and claims priority to co-pending U.S. application entitled "System and Method for Providing Security Monitoring", Ser. No. 14/930,958 filed 3 Nov. 2015, which in turn claims priority to U.S. provisional application entitled "System and Method for Providing Security Monitoring", Ser. No. 62/075,664 filed 5 Nov. 2014, the entirety of each is hereby incorporated herein by reference.

BACKGROUND

Physical security of areas and buildings, including, but not limited to, offices, homes, warehouses, government buildings, public use buildings, transportation depots, airports, storage lots, etc., whether occupied or unoccupied, has become an important aspect of everyday life. Monitoring systems exist to ensure the security of these areas and/or structures and typically use technology to capture information from a variety of sensors, e.g., video, audio, infrared, proximity sensors, motion sensors, and/or ingress/egress sensors, or some combination of these and other sensor inputs. However, the huge amount of data received from even one sensor type and typically stored in archival storage, either onsite or offsite, make using these systems cumbersome and ineffective. Typically, offsite data archiving is useful for storing large amounts of data, but retrieving that data is difficult, time-consuming, and cannot be performed in a manner that allows a portion of the data to be reviewed in a timely manner at the request of a user. Onsite storage, on the other hand, is typically easier and quicker to access, but is generally limited in the amount of data it can handle.

Current state of the art systems do not allow for a determination or selection of where security system sensor data is to be stored thereby making the data hard to recover and review in a timely manner when requested by a user. Furthermore, current systems generally treat all of the sensor data as being the same, which exacerbates the problem of timely retrieval. Additionally, current state of the art systems do not allow for different management schemes for the data streams, e.g., viewing and recording, depending on whether the request and/or instructions came from a local user/inside user or a mobile/outside user.

Accordingly, there is a need for systems and methods for processing security sensor data that enhances the ability of a user to quickly and efficiently review selected portions of the data streams.

DETAILED DESCRIPTION

Figure 1:
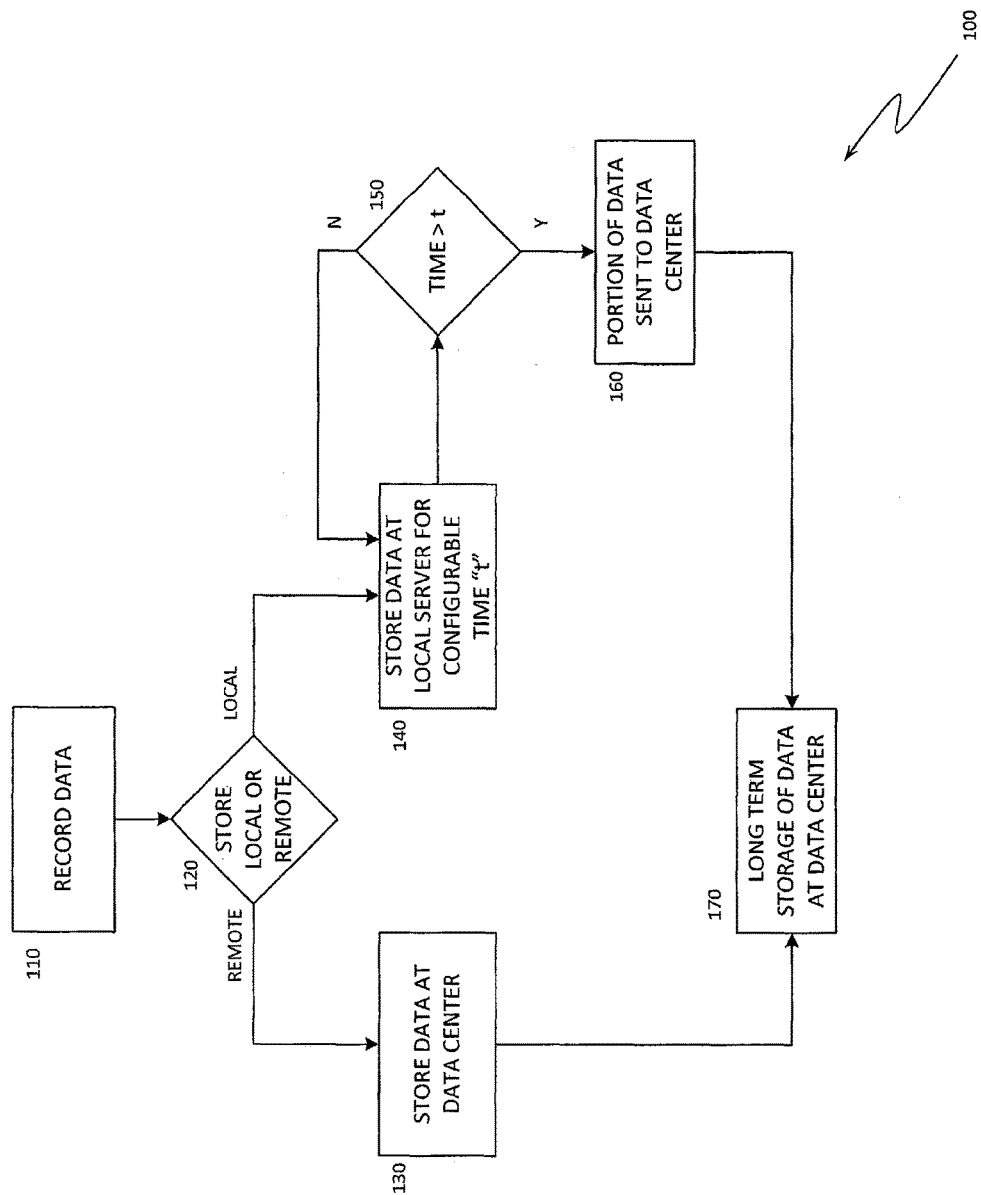
FIG. 1 is a flow chart for a process for storing security data according to an embodiment of the present subject matter.

The following description of the present subject matter is provided as an enabling teaching of the present subject matter and its best, currently-known embodiment. Those skilled in the art will recognize that many changes can be made to the embodiments described herein while still obtaining the beneficial results of the present subject matter. It will also be apparent that for some embodiments, some of the desired benefits of the present subject matter can be obtained by selecting some of the features of the present subject matter without utilizing other features. Accordingly, those skilled in the art will recognize that many modifications and adaptations of the present subject matter are possible and may even be desirable in certain circumstances and are part of the present subject matter. Thus, the following description is provided as illustrative of the principles of the present subject matter and not in limitation thereof and may include modification thereto and permutations thereof. While the following exemplary discussion of embodiments of the present subject matter may be directed towards or reference specific systems and/or methods for remote measurement and process control solutions, it is to be understood that the discussion is not intended to limit the scope of the present subject matter in any way and that the principles presented are equally applicable to other systems and/or methods for remote measurement and process control solutions.

Those skilled in the art will further appreciate that many modifications to the exemplary embodiments described herein are possible without departing from the spirit and scope of the present subject matter. Thus, the description is not intended and should not be construed to be limited to the examples given but should be granted the full breadth of protection afforded by the appended claims and equivalents thereto.

The disclosure includes methods and systems for providing security monitoring services to customers. In an embodiment, data monitoring analytics and archival services (data may include video, audio, infrared, proximity sensors, and/or ingress/egress sensors information) are provided to clients through a cloud-based architecture in which long-term storage of client video is maintained on servers at a remote data center. Clients can access and analyze their footage from the client site while maintaining local control of surveillance equipment. In addition, clients may have short term video storage capability on site for a configurable duration of time. Virtual Private Networks provide secure connections between the client site and data center, a remote central monitoring station, and mobile devices. Through a secure mobile and web access interface, clients can remotely control surveillance equipment and view live or recorded video. This remote viewing capability for the client is achieved via an authentication process between the mobile device and the data center. Once authenticated, a secure connection to the data center and client site is established enabling the user to view archived footage or monitor the client site security system.

With reference to the figures where like elements have been given like numerical designations to facilitate an understanding of the present subject matter, various embodiments of a system and method for providing security monitoring services to customers are described.

With attention drawn to FIG. 1, a flow chart 100 is presented for a process for storing security data according to an embodiment of the present subject matter. At block 110, security sensor data is recorded. This data may include video, audio, infrared, proximity sensors, and/or ingress/egress sensors information, among other security data. The security data that is recorded is configurable by a user. For example, the data may be of a time stream, where the data may be a continuous time stream, a stream of data taken once every second, every five seconds, every minute, etc. Additionally, the data recording may be initiated by an event, such as when a state change is sensed (i.e., a trigger event). Typical state changes may include, but are not limited to, detection of motion/movement, detection of a noise, the opening or closing of a door or window or other ingress/egress portal, or any other security-based trigger than may be defined by a user or system operator. At block 120 a decision is made regarding the storage location for the recorded data, either at a local or onsite server, such as at the client's site, or at a remote or offsite server, such as at a data center. The decision may be made either onsite or offsite, for example, by the client, a user of the system (typically associated with the client), or a system operator who is monitoring the client's security system and may be located at a central monitoring station. The decision of where to send the recorded data may be preset into the security system and be configurable by an authorized person (e.g., client, user, system operator, etc.).

If the decision at block 120 is for remote storage, then at block 130 the recorded data is stored at a remote or offsite location, such as at a data center. The data center typically includes one or more of servers, processors, and electronic memory/storage devices for storing the recorded data. The data center servers may include a management server for authorizing and/or communicating with the security system client or user or with the system operator which may be an entity separate from the client. The data center servers may also include a SQL server for authenticating and/or handling identification information (username, password, etc.) as well as handling administrative information such as billing information and time information. The data center servers may also include a mobile device server which may act as an interface/gateway for mobile devices to communicate with the security system and may also package and/or format data for a mobile device application software program and/or the mobile device screen. The data center servers may also include a recording server for storing and/or retrieving recorded data.

Typically, after some predetermined, configurable, time duration, the recorded data at the data center may be transferred, at block 170, to a long term data storage device/facility. In an embodiment, the data center may physically and/or logically contain both the storage equipment used at block 130 and the long term data storage equipment used at block 170.

If the decision at block 120 is for local storage, then at block 140 the recorded data is stored at a local or onsite location, typically at the client's site. The local storage typically includes one or more of servers, processors, and electronic memory/storage devices for storing the recorded data. In an embodiment, the local storage includes a local recording server for storing and/or retrieving recorded data. In this embodiment, the local recording server would interface with one or more of the management server, SQL server, and mobile server which would be located remotely at the remote data center.

Since local storage capacity is usually much less than remote storage capacity, data stored in local storage may be cycled out to remote storage after a configurable time duration has elapsed for the data. Thus, at block 150, a comparison is made to determine if a particular amount of stored data in local storage has been in local storage for a time greater than some configurable time t. Time t may be any value and typically is between zero to seven days, although other values for t are contemplated herein. The particular amount of stored data may be one or more bytes of data, a block of data (e.g., all data stored in a given time frame), or data associated with a trigger event or between trigger events. The particular amount of stored data can be configurable and may be preset into the security system. More than one type of preset stored data amounts may be present at any given time, e.g., a first amount of stored data may be continuous recorded data for a particular time frame while a second amount of stored data may be associated with a trigger event. If storage time is not greater than t, then the stored data remains in local storage. If the storage time is greater than t, then the stored data, or some portion of the stored data, is sent, at block 160, to a remote storage location, such as the data center. Typically, after some predetermined, configurable, time duration, the recorded data at the data center at block 160 may be transferred, at block 170, to a long term data storage device/facility. In an embodiment, the data center may physically and/or logically contain both the storage equipment used at block 160 and the long term data storage equipment used at block 170.

The portion of data that is sent to remote storage is configurable by an authorized person. For example, if the stored data represents a continuous stream of video data from a camera pointed at a door during time frame TF1, and a portion of the data collected during TF1 includes a trigger event, such as the door opening, and the trigger event occurs during time frame TF2 within TF1, the portion of data that is sent to remote storage may be all the data associated with TF1 with the exception of the data associated with TF2, which is kept in local storage for ease of access.

Figure 2:
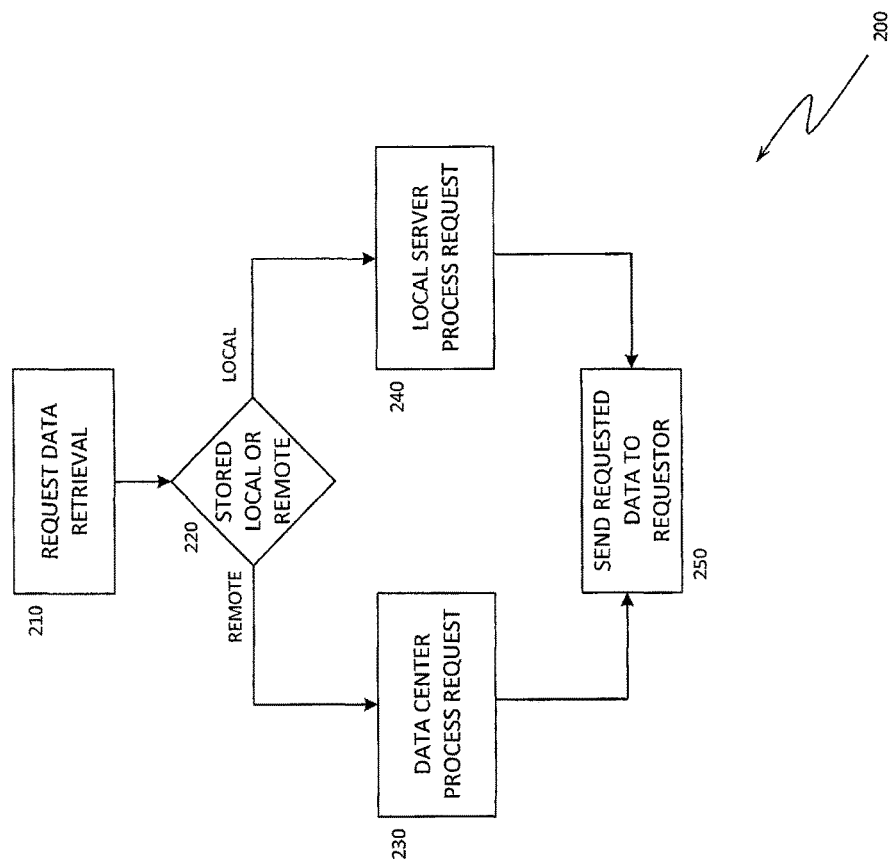
FIG. 2 is a flow chart for a process for retrieving stored security data according to an embodiment of the present subject matter.

Now turning to FIG. 2, a flow chart 200 is shown for a process for retrieving stored security data according to an embodiment of the present subject matter. At block 210, a request for data retrieval is received. If the request is originated from inside the security system, i.e., from a device at the client site or from the system operator at the central station, the data retrieval request is received by the management server at the data center which coordinates with the SQL server for authentication of the requestor and for handling the administrative functions (e.g., username/password, billing, time, etc.), and then interfaces with the recording server, after determining at block 220 whether the data requested is located remotely at the data center or locally at the client site, to respond to the retrieval request.

If the request is originated from outside the security system, e.g., from a mobile device such as, but not limited to, a smart phone or laptop computer, the data retrieval request is received by the mobile server at the data center. The mobile server interfaces with the management server at the data center which coordinates with the SQL server for authentication of the requestor and for handling the administrative functions (e.g., username/password, billing, time, etc.), and then interfaces with the recording server, after determining at block 220 whether the data requested is located remotely at the data center or locally at the client site, to respond to the retrieval request.

If the requested data is stored remotely, at block 230 the data center processes the data retrieval request, as discussed above and may also sequence and/or format the data as necessary, and at block 250 the requested data is sent to the requesting device. If the requested data is stored locally, at block 240 the data center processes the data retrieval request, as discussed above and may also sequence and/or format the data as necessary, and at block 250 the requested data is sent to the requesting device.

Figure 3:
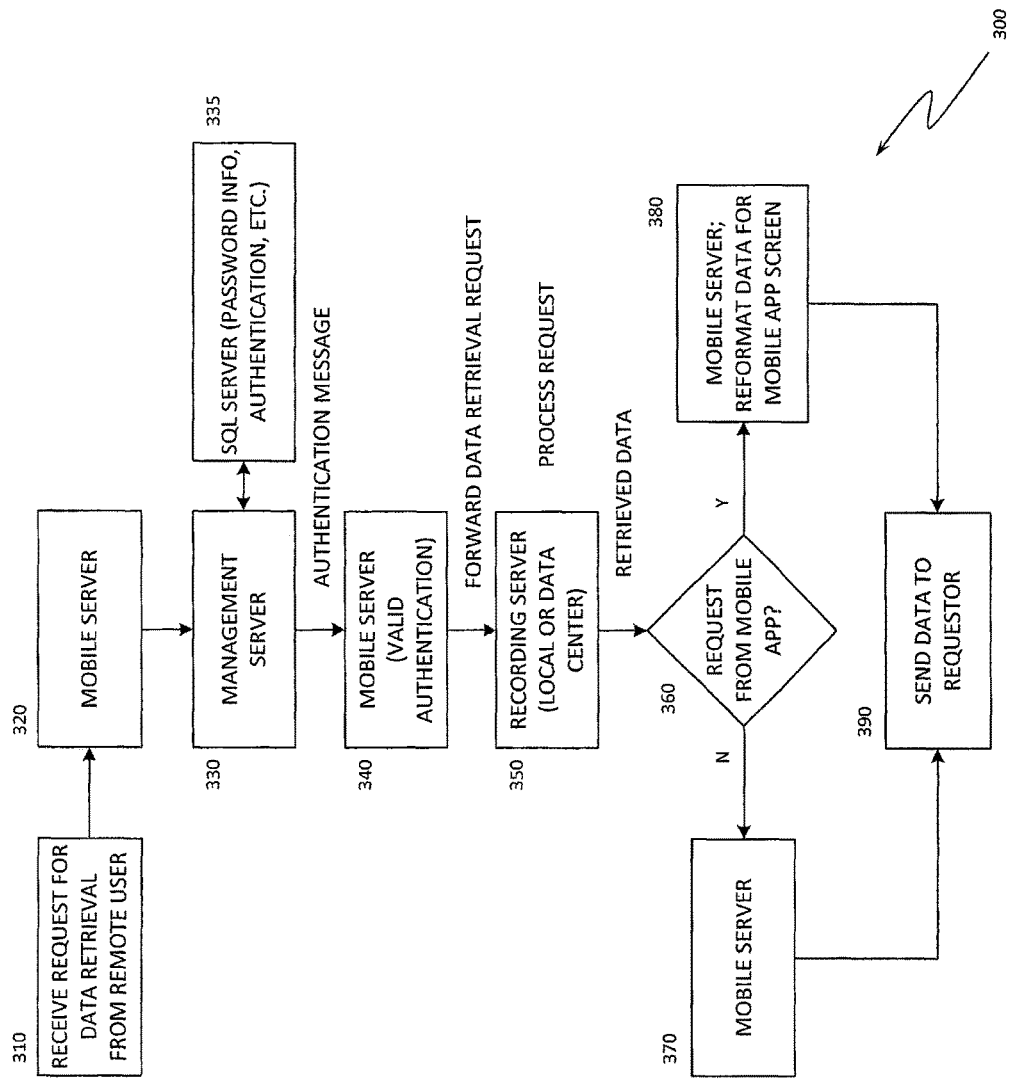
FIG. 3 is a flow chart for a process for retrieving stored security data in response to a request from a remote user according to an embodiment of the present subject matter.

FIG. 3 illustrates a flow chart 300 for a process for retrieving stored security data in response to a request from a remote user/requestor according to an embodiment of the present subject matter. It will be understood by those of skill in the art that the remote user includes a mobile user that is physically located anywhere, including at the client site, the data center, and/or the central station. In the embodiment shown in FIG. 3, at block 310 a request for data retrieval is received from a remote user by the mobile server at block 320. The request may include one or more particular time frames of data for retrieval and/or an identification of one or more sensors from which stored data is to be retrieved and/or a location that is being monitored. The mobile server interfaces with the management server at block 330 which interfaces with the SQL server at block 335 for authentication of the remote user and for administrative functions. If the remote user is authenticated, the management server sends an authentication message to the mobile server at block 340. Upon receipt of the authentication message from the management server, the mobile server forwards the data retrieval request to the recording server at block 350 which processes the retrieval request and retrieves the data corresponding to the request from the appropriate storage devices using a process similar to that discussed above with respect to FIG. 2. If the requested recorded data is located in a remote recording server and the security system includes both a remote and a local recording server, the requested data is sent from the remote recording server to the local recording server prior to being sent to the mobile server.

The appropriate recording server sends the retrieved data to the mobile server at block 360 where the mobile server determines whether the remote user is using a mobile app which will require reformatting of the retrieved data. If the remote user is not using a mobile app requiring reformatting of the retrieved data, then at block 370 the mobile server sends the retrieved data to the remote user at block 390. If the remote user is using a mobile app requiring reformatting of the retrieved data, then at block 380 the mobile server reformats the retrieved data for the mobile app software and/or screen and sends the reformatted retrieved data to the remote user at block 390.

Figure 4:
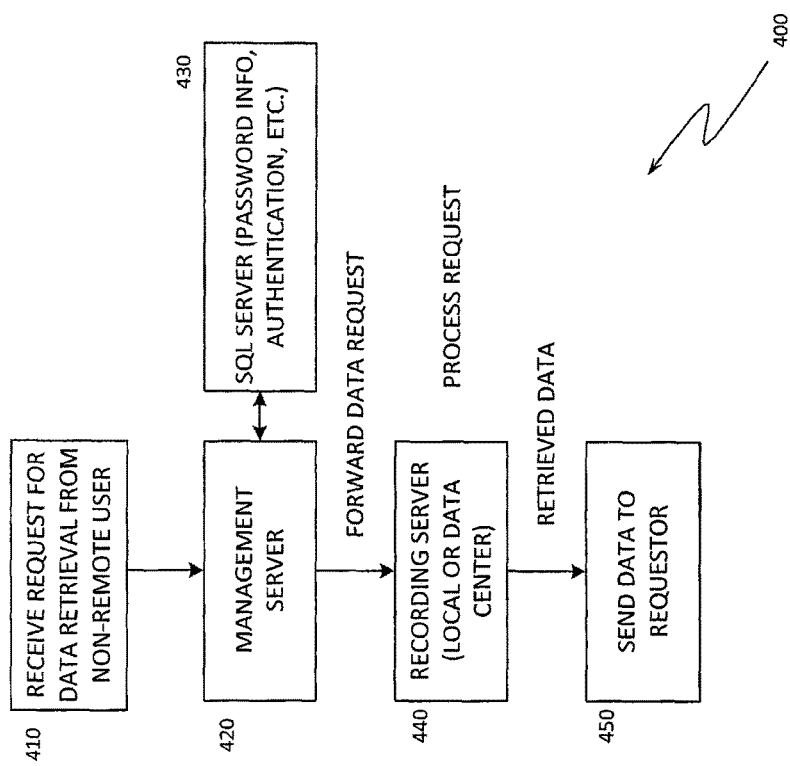
FIG. 4 is a flow chart for a process for retrieving stored security data in response to a request from a non-remote user according to an embodiment of the present subject matter.

Considering FIG. 4, a flow chart 400 is presented for a process for retrieving stored security data in response to a request from a non-remote user according to an embodiment of the present subject matter. At block 410 a request for data retrieval is received from a non-remote user by the management server at block 420. The request may include one or more particular time frames of data for retrieval and/or an identification of one or more sensors from which stored data is to be retrieved. The management server interfaces with the SQL server at block 430 for authentication of the non-remote user and for administrative functions. If the non-remote user is authenticated, the management server sends the data retrieval request to the recording server at block 440 which processes the retrieval request and retrieves the data corresponding to the request from the appropriate storage devices using a process similar to that discussed above with respect to FIG. 2. If the requested recorded data is located in a remote recording server and the security system includes both a remote and a local recording server, the requested data is sent from the remote recording server to the local recording server prior to being sent to the mobile server. The appropriate recording server sends the retrieved data to the non-remote user at block 450.

Figure 5:
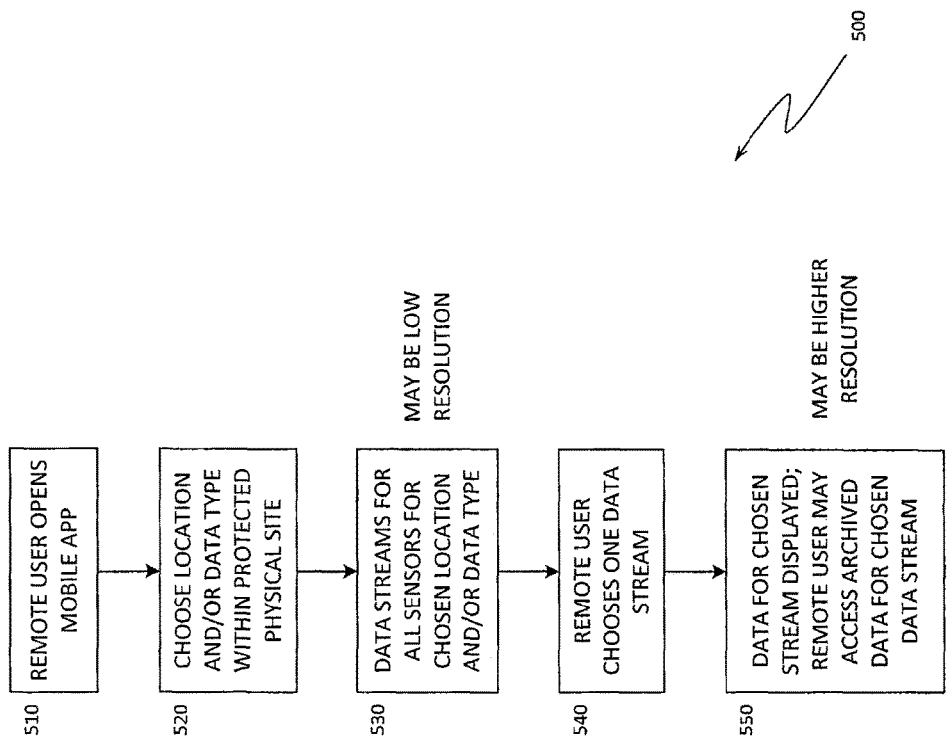
FIG. 5 is a flow chart for a process for a remote user to receive security data according to an embodiment of the present subject matter.

Now considering FIG. 5, a flow chart 500 is presented for a process for a remote user to receive security data according to an embodiment of the present subject matter. At block 510, the remote user opens a mobile app on a smart phone or similar device. At block 520, the remote user chooses a location and/or a particular sensor and/or data type (e.g., audio, visual, infrared, a trigger event, a combination of sensor data, etc.) to be retrieved for a particular time frame from a security system for which the remote user is an authorized user. As a non-limiting example, assume that the remote user chooses a specific location (e.g., an entranceway into a building) for time frame TF3. Time frame TF3 may be all in the past or may include data currently being recorded (i.e., live data). At block 530, the security system (such as one described above) sends to the remote user a set of all or some of the data streams for the chosen location for time frame TF3, such as a video data stream, an infrared data stream, and data of any trigger events that occurred during time frame TF3. In an embodiment, the set of data streams being sent by the security system will be low resolution data and the data will be appropriately displayed on the remote user's mobile device. In this example, the remote user's mobile device will display a video data stream, an infrared data stream, and information indicative of the trigger events. Those of skill in the art will readily understand that the mobile device will display/present the sensor data in the appropriate format for the corresponding data stream.

At block 540, the remote user chooses one, or more, of the data streams in the set of data streams by, for example, tapping/clicking on the display for the chosen data stream. The tapping/clicking of the chosen data stream will send a selection signal back to the security system which, upon receipt of the selection signal, will then send to the remote user's device, at block 550, a subset of the set of data streams that were being sent where the subset includes only those data streams that the remote user selected. The data streams in this subset, in an embodiment, will be at a higher resolution than the data streams in the original set of data streams. The remote user will also have the capability of accessing any archived data for the subset of data streams. In a further embodiment, one or more data streams may be automatically pushed to the remote user based on the occurrence of a predetermined event, such as a trigger event.

Figure 6:
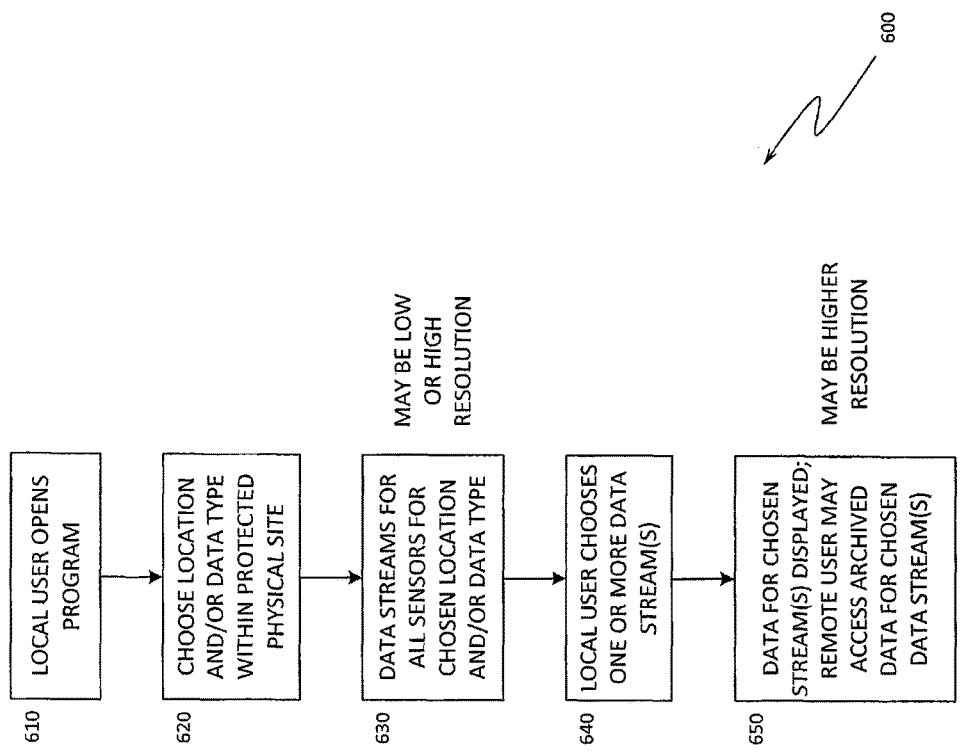
FIG. 6 is a flow chart for a process for a non-remote user to receive security data according to an embodiment of the present subject matter.

FIG. 6 shows a flow chart 600 for a process for a non-remote/local user to receive security data according to an embodiment of the present subject matter. At block 610, the local user typically opens an application on a computer terminal that is inside the security system, i.e., typically connected via a wired link to the security system either at the client site, at the central monitoring station, or at the data center. At block 620, the local user chooses a location and/or a particular sensor and/or data type (e.g., audio, visual, infrared, a trigger event, a combination of sensor data, etc.) to be retrieved for a particular time frame from the security system for which the local user is an authorized user.

As a non-limiting example, assume that the local user chooses a specific location (e.g., an entranceway into a building) for time frame TF3. Time frame TF3 may be all in the past or may include data currently being recorded (i.e., live data). At block 630, the security system (such as one described above) sends to the local user a set of all or some of the data streams for the chosen location for time frame TF3, such as a video data stream, an infrared data stream, and data of any trigger events that occurred during time frame TF3. In an embodiment, the set of data streams being sent by the security system will be either low or high resolution data and the data will be appropriately displayed on the local user's computer display device. In this example, the local user's computer display device will display a video data stream, an infrared data stream, and information indicative of the trigger events. Those of skill in the art will readily understand that the computer display device will display/present the sensor data in the appropriate format for the corresponding data stream.

At block 640, the local user chooses one, or more, of the data streams in the set of data streams by, for example, tapping/clicking on the display for the chosen data stream. The tapping/clicking of the chosen data stream will send a selection signal back to the security system which, upon receipt of the selection signal, will then send to the local user's device, at block 650, a subset of the set of data streams that were being sent where the subset includes only those data streams that the local user selected. The data streams in this subset, in an embodiment, will be at a higher resolution than the data streams in the original set of data streams. The local user will also have the capability of accessing any archived data for the subset of data streams. In a further embodiment, one or more data streams may be automatically pushed to the local user based on the occurrence of a predetermined event, such as a trigger event.

Figure 7:
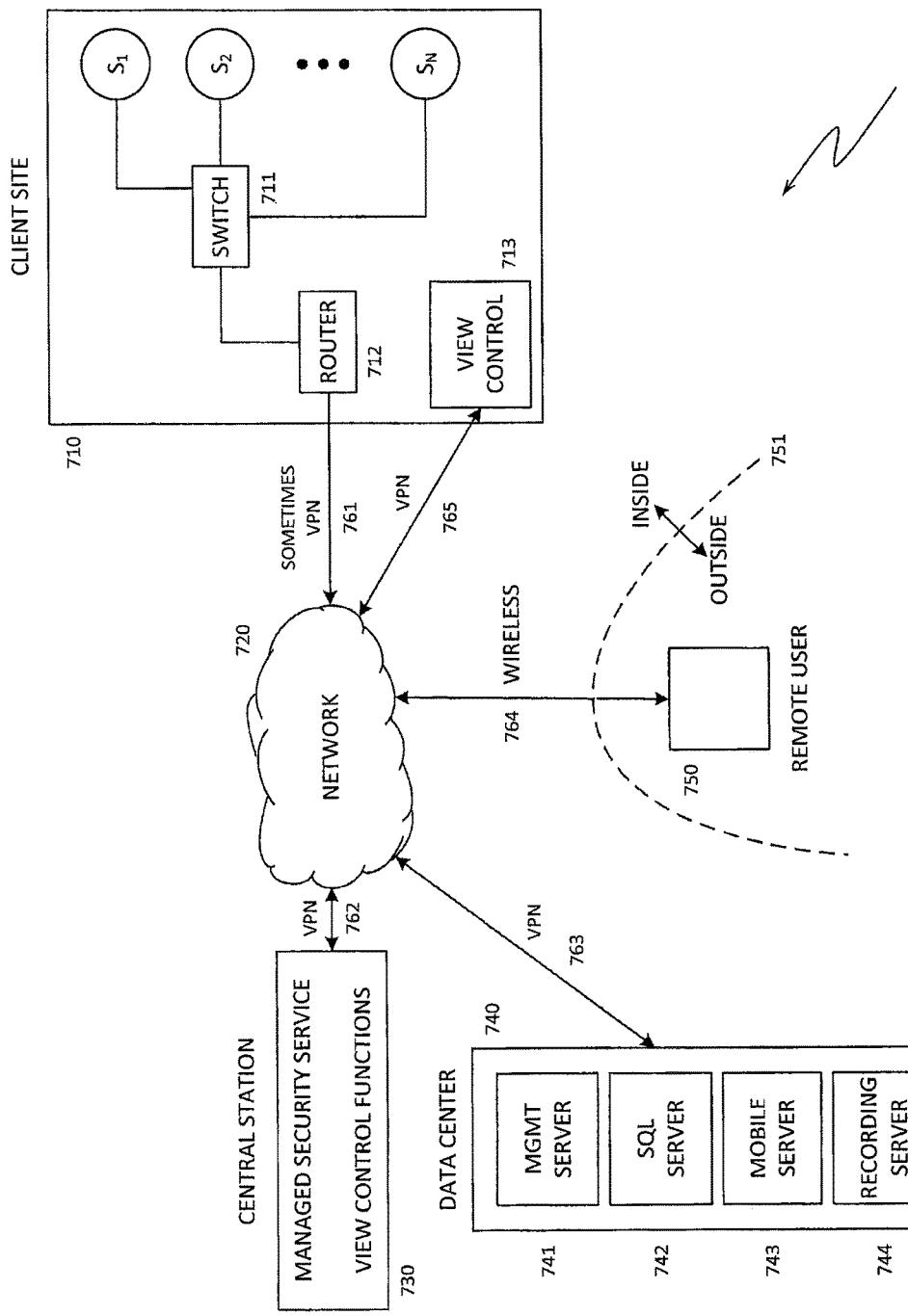
FIG. 7 is a functional block diagram for a configuration for routing security data according to an embodiment of the present subject matter.

FIG. 7 depicts a functional block diagram 700 for a configuration for routing (recording, storage, retrieval, etc.) security data according to an embodiment of the present subject matter as described above for this configuration. In this configuration, recorded security data is streamed directly to the cloud for storage offsite from the client site 710. A security system typically is set up at a client site 710 which may be a structure (building, warehouse, office, depot, house, etc.) or an area (airport, railroad yard, parking lot, public park, etc.) or some combination of the two. The security system at the client site includes sensors $S_1$, $S_2$, ... $S_N$, which, as discussed above, may be different types of sensors (audio, video, etc.), may be manufactured from different manufacturers, or may all the same type of and/or manufacture of sensor. The security system is designed such that it will accept data streams from a variety of sensor types/manufactures thereby giving the client flexibility in the types of sensors to deploy as well as the cost of the security system. The security system also includes a switch 711 which interfaces with the sensors and the router 712 which interfaces, via connection 761, between the devices at the client site 710 and the network 720 which may be the internet or other computer network. The connection 761 may be a virtual private network ("VPN") connection, as is known in the art. In an embodiment, connection 761 is a VPN connection except when passing sensor data streams out from the client site 710. In an embodiment, the security system at the client site 710 may also include a view control device 713 which may be operated by a local user at the client site to monitor/retrieve sensor data streams as discussed above. In the configuration shown in FIG. 7, the view control device 713 is connected to the network 720 via VPN connection 765. Note that in the configuration depicted in FIG. 7 the recording server is located remotely in the data center 740 rather than locally at the client site 710 and therefore operates in accordance with the embodiments above that correspond to this arrangement.

The security system may also include a central station 730 connected to the network 720 via VPN connection 762. The central station may be operated by a contractor for the client. The central station, in addition to the capabilities described above, may include functionality for managing the security service/system including managing video services, and may further include view control functionality such as monitoring/retrieving sensor data streams as discussed above, monitoring sensor performance, data center performance, system usage, etc.

The security system may further include a data center 740 connected to the network 720 via VPN connection 763. In the configuration shown in FIG. 7, data center 740 includes a management server 741, a SQL server 742, a mobile server 743 and a recording server 744, all of which operate as described above for this configuration.

As described above, remote user 750 is connected to the network 720 through wireless connection 764. Note that inside/outside demarcation line 751 is a logical demarcation between devices treated as being inside the security system and those treated as being outside the security system and is not necessarily a physical demarcation. As discussed above, remote user 750 may be physically located anywhere, including within the physical confines of client site 710, but will still be treated as being a remote wireless user.

Figure 8:
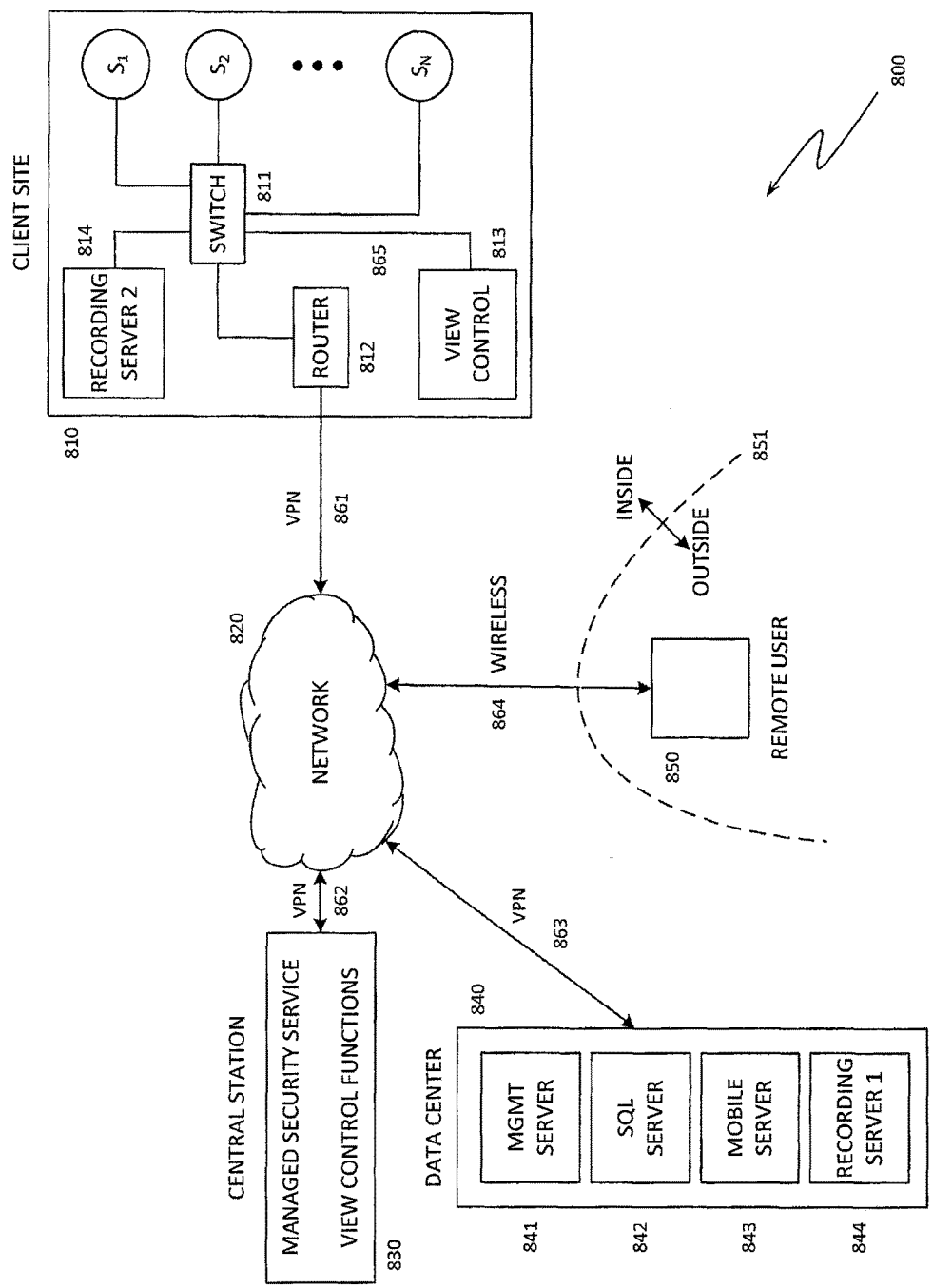
FIG. 8 is a functional block diagram for a configuration for routing security data according to another embodiment of the present subject matter.

With attention now drawn to FIG. 8, a functional block diagram 800 is depicted for a configuration for routing (recording, storage, retrieval, etc.) security data according to another embodiment of the present subject matter as described above for this configuration. In this configuration, recorded security data may be streamed either to local storage at recording server 2, 814, at client site 810 or directly to the cloud for storage offsite at recording server 1, 844, at data center 840.

A security system typically is set up at a client site 810 which may be a structure (building, warehouse, office, depot, house, etc.) or an area (airport, railroad yard, parking lot, public park, etc.) or some combination of the two. The security system at the client site includes sensors $S_1$, $S_2$, ... $S_N$, which, as discussed above, may be different types of sensors (audio, video, etc.), may be manufactured from different manufacturers, or may all the same type of and/or manufacture of sensor. The security system is designed such that it will accept data streams from a variety of sensor types/manufactures thereby giving the client flexibility in the types of sensors to deploy as well as the cost of the security system. The security system also includes a switch 811 which interfaces with the sensors and the router 812 as well as with view control 813, via connection 865, and recording server 2, 814.

The router 812 interfaces, via connection 861, between the devices at the client site 810 and the network 820 which may be the internet or other computer network. The connection 861 may be a virtual private network ("VPN") connection, as is known in the art. In an embodiment, connection 861 is a VPN connection. The security system at the client site 810 may also include the view control device 813 which may be operated by a local user at the client site to monitor/retrieve sensor data streams as discussed above.

In the configuration shown in FIG. 8, the view control device 813 is connected to the switch 811 via connection 865. Note that in the configuration depicted in FIG. 8 the recording server 2, 814, is located locally at the client site 810 and the recording server 1, 844, is located remotely in the data center 840. Therefore, the security system depicted in FIG. 8 operates in accordance with the embodiments above that correspond to this arrangement.

The security system may also include a central station 830 connected to the network 820 via VPN connection 862. The central station may be operated by a contractor for the client. The central station, in addition to the capabilities described above, may include functionality for managing the security service/system including managing video services, and may further include view control functionality such as monitoring/retrieving sensor data streams as discussed above, monitoring sensor performance, data center performance, system usage, etc.

The security system may further include a data center 840 connected to the network 820 via VPN connection 863. In the configuration shown in FIG. 8, data center 840 includes a management server 841, a SQL server 842, a mobile server 843 and a recording server 1, 844, all of which operate as described above for this configuration.

As described above, remote user 850 is connected to the network 820 through wireless connection 864. Note that inside/outside demarcation line 851 is a logical demarcation between devices treated as being inside the security system and those treated as being outside the security system and is not necessarily a physical demarcation. As discussed above, remote user 850 may be physically located anywhere, including within the physical confines of client site 810, but will still be treated as being a remote wireless user.

In the configuration shown in FIG. 8, requested recorded and/or stored data may be viewed by the remote user 850 via the mobile server 843, whether the requested data is stored locally at recording server 2, 814, or remotely at recording server 1, 844. If the requested data is stored remotely at recording server 1, 844, the requested data is first transferred from recording server 1, 844, to recording server 2, 814, and then sent to the mobile server 843 before being sent to the remote user 850.

In the configuration shown in FIG. 8, requested recorded and/or stored data may be viewed by a local user at, for example, the view control device 813. The view control device 813 receives the requested recorded and/or stored data from recording server 2, 814, via switch 811. If the requested data is stored remotely at recording server 1, 844, the requested data is first transferred from recording server 1, 844, to recording server 2, 814, and then sent to the view control device 813 via switch 811.

Figure 9:
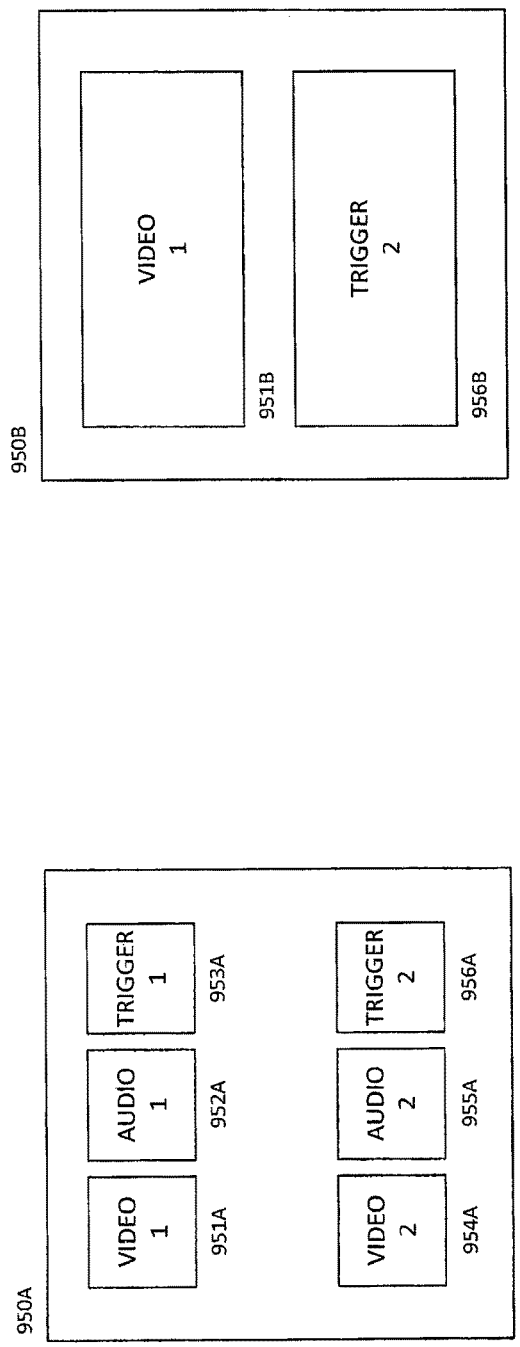
FIG. 9 is a notional view of a remote user's mobile device showing a set of data streams at 950A and a subset of data streams at 950B.

Considering FIG. 9, a notional view of a remote user's mobile device showing a set of data streams is presented at 950A and a notional view of the remote user's mobile device showing a subset of data streams is presented at 950B.

As discussed above, in an embodiment, a remote user's mobile device 950A may receive a set of data streams that meet criteria chosen by the remote user. In this example, mobile device 950A is receiving and displaying, typically, but not necessarily, at a low resolution, data streams from video sensor 1, 951A, audio sensor 1, 952A, trigger sensor 1, 953A, video sensor 2, 954A, audio sensor 2, 955A, and trigger sensor 2, 956A. Those of skill in the art will readily understand that more or fewer data streams and associated displays are contemplated herein. The remote user may choose one, or more, of the data streams in the set of data streams on device 950A by, for example, tapping/clicking on the display for the chosen data stream(s). The tapping/clicking of the chosen data stream will send a selection signal back to the security system which, upon receipt of the selection signal, will then send to the remote user's device 950B (which is the same mobile device as 950A but displaying different data stream information), a subset of the set of data streams that were being sent where the subset includes only those data streams that the remote user selected. In the example in FIG. 9, the remote user has selected the data streams for video 1, 951A, which is displayed on the mobile device 950B as 951B, and trigger 2, 956A, which is displayed on the mobile device 950B as 956B. Typically, the data streams 951B and 956B being displayed on the mobile device 950B will be at a higher resolution than the data streams 951A and 956A in the original set of data streams on mobile device 950A. The remote user will also have the capability of accessing any archived data for the subset of data streams. In a further embodiment, one or more data streams may be automatically pushed to the remote user based on the occurrence of a predetermined event, such as a trigger event. Additionally, those of skill in the art will readily understand that in certain embodiments similar displays may be presented to a local/inside user at, for example, the view control device 713 in FIG. 7 and/or the view control device 813 in FIG. 8.

In an embodiment, a method for processing data is described wherein data is recorded with a recording device, a determination is made regarding whether a storage device for the recorded data is local or remote from the recording device; for the condition where the storage device is remotely located, the recorded data is stored in a first remote storage device; and for the condition where the storage device is locally located, the recorded data is stored in a local storage device at time $t_1$, and, a predetermined portion of the locally-recorded data is sent to a second remote storage device at time $t_2$, where $t_2$ is a predetermined amount of time after $t_1$.

In another embodiment, the above-described method for processing data further includes receiving a retrieval request for retrieving a first portion of the recorded data, determining if the first portion of the recorded data is stored at the first remote storage device, at the second remote storage device, or at the local storage device, for the condition where the first portion of the recorded data is stored at either the first or second remote storage device, processing the first portion of the recorded data at a remote server where the processing includes sequencing the first portion of the recorded data in chronological order, and for the condition where the first portion of the recorded data is stored at the local storage device, processing the first portion of the recorded data at a local server where the processing includes sequencing the first portion of the recorded data in chronological order.

In yet another embodiment, the above-described method for processing data further includes receiving at an interface server a data retrieval request from a remote user's device for retrieving a first portion of the recorded data, where the data retrieval request includes authentication information for the remote user, forwarding the authentication information to an authentication server and authenticating the remote user, sending an authentication message to the interface server from the authentication server, where upon receipt of the authentication message, forwarding the data retrieval request to a first server, processing the data retrieval request at the first server, determining if the first portion of the recorded data is stored at the first remote storage device, at the second remote storage device, or at the local storage device, forwarding the first portion of the recorded data to the first server, forwarding the first portion of the recorded data from the first server to the interface server, processing the first portion of the recorded data at the interface server where the processing includes sequencing the first portion of the recorded data in chronological order, determining a format for the remote user's device to display the first portion of the recorded data, and sending the first portion of the recorded data in the determined format from the interface server to the remote user's device.

In still another embodiment, the step of determining if the first portion of the recorded data is stored at the first remote storage device, at the second remote storage device, or at the local storage device is based at least in part on comparing a time stamp associated with the first portion of the recorded data with time $t_2$.

In yet still another embodiment, the above-described method for processing data further includes receiving at an authentication server a data retrieval request from a non-remote user's device for retrieving a first portion of the recorded data, where the data retrieval request includes authentication information for the non-remote user, authenticating the non-remote user based on the authentication information, forwarding the data retrieval request to a first server, processing the data retrieval request at the first server, determining if the first portion of the recorded data is stored at the first remote storage device, at the second remote storage device, or at the local storage device, forwarding the first portion of the recorded data to the first server, processing the first portion of the recorded data at the first server where the processing includes sequencing the first portion of the recorded data in chronological order, and sending the first portion of the recorded data in the determined format from the interface server to the remote user's device.

In a further embodiment, the step of determining if the first portion of the recorded data is stored at the first remote storage device, at the second remote storage device, or at the local storage device is based at least in part on comparing a time stamp associated with the first portion of the recorded data with time $t_2$.

Certain embodiments of the present disclosure may be implemented by one or more computers programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer.

Computer readable media suitable for storing computer program instructions and/or data include all forms of data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:
1. A method for processing data, the method comprising the steps of:
    (a) recording data with a recording device;
    (b) storing the recorded data in the first storage device at time $t_1$, wherein the first storage device is located locally to said recording device;
    (c) at time $t_2$, wherein $t_2$ is a predetermined amount of time after $t_1$:
        (i) sending a predetermined portion of the stored recorded data to a second storage device located remotely from said recording device; and
        (ii) erasing the predetermined portion of the stored recorded data from the first storage device;
    (d) receiving a retrieval request for retrieving a first segment of the recorded data;
    (e) determining if the first segment of the recorded data is stored at said first storage device or at said second storage device;
    (f) for the condition where the first segment of the recorded data is stored at said first storage device, processing the first segment of the recorded data at a local server wherein said processing includes sequencing the first segment of the recorded data in chronological order; and
    (g) for the condition where the first segment of the recorded data is stored at said second storage device, processing the first segment of the recorded data at a remote server wherein said processing includes sequencing the first segment of the recorded data in chronological order.

2. The method of claim 1 wherein the retrieval request is received from a local user, a remote user, or from a central monitoring station user.

3. The method of claim 1 wherein the recorded data is selected from the group consisting of: video data, audio data, infrared data, proximity sensor data, ingress and/or egress sensor data, and combinations thereof.

4. The method of claim 1 wherein the recorded data comprises a first portion of data associated with a time frame TF1 and a second portion of data associated with a time frame TF2, wherein at least a portion of TF2 overlaps TF1 in time.

5. The method of claim 4 wherein the second portion of data is associated with a trigger event.

6. The method of claim 4 wherein the predetermined portion of the stored recorded data is the first portion of data.

7. The method of claim 4 wherein the predetermined portion of the stored recorded data is the first portion of data exclusive of the second portion of data.

8. The method of claim 7 wherein the second portion of data is associated with a trigger event.

9. The method of claim 4 wherein the recorded data is selected from the group consisting of: video data, audio data, infrared data, proximity sensor data, ingress and/or egress sensor data, and combinations thereof.

10. A method for processing data, the method comprising the steps of:
    (a) recording data with a recording device;
    (b) storing the recorded data in the first storage device at time $t_1$, wherein the first storage device is located locally to said recording device;
    (c) at time $t_2$, wherein $t_2$ is a predetermined amount of time after $t_1$:
        (i) sending a predetermined portion of the stored recorded data to a second storage device located remotely from said recording device; and
        (ii) erasing the predetermined portion of the stored recorded data from the first storage device;
    (d) receiving at an interface server a data retrieval request from a remote user's device for retrieving a first segment of the recorded data, wherein the data retrieval request includes authentication information for the remote user;
    (e) forwarding the authentication information to an authentication server and authenticating the remote user;
    (f) sending an authentication message to said interface server from said authentication server;
    (g) upon receipt of the authentication message, forwarding the data retrieval request to a first server;
    (h) processing the data retrieval request at said first server;
    (i) determining if the first segment of the recorded data is stored at said first storage device or at said second storage device;
    (j) forwarding the first segment of the recorded data to said first server;
    (k) forwarding the first segment of the recorded data from said first server to said interface server;
    (l) processing the first segment of the recorded data at said interface server wherein said processing includes sequencing the first segment of the recorded data in chronological order;
    (m) determining a format for the remote user's device to display the first segment of the recorded data; and
    (n) sending the first segment of the recorded data in the determined format from the interface server to the remote user's device.

11. The method of claim 10 wherein the step of determining if the first segment of the recorded data is stored at said first storage device or at said second storage device is based at least in part on comparing a time stamp associated with said first segment of the recorded data with time $t_2$.

12. The method of claim 10 wherein the recorded data is selected from the group consisting of: video data, audio data, infrared data, proximity sensor data, ingress and/or egress sensor data, and combinations thereof.

13. The method of claim 10 wherein the recorded data comprises a first portion of data associated with a time frame TF1 and a second portion of data associated with a time frame TF2, wherein at least a portion of TF2 overlaps TF1 in time.

14. The method of claim 13 wherein the second portion of data is associated with a trigger event.

15. The method of claim 13 wherein the predetermined portion of the stored recorded data is the first portion of data.

16. The method of claim 13 wherein the predetermined portion of the stored recorded data is the first portion of data exclusive of the second portion of data.

17. The method of claim 16 wherein the second portion of data is associated with a trigger event.

18. The method of claim 13 wherein the recorded data is selected from the group consisting of: video data, audio data, infrared data, proximity sensor data, ingress and/or egress sensor data, and combinations thereof.

19. A method for processing data, the method comprising the steps of:
 (a) recording data with a recording device;
 (b) storing the recorded data in the first storage device at time $t_1$, wherein the first storage device is located locally to said recording device;
 (c) at time $t_2$, wherein $t_2$ is a predetermined amount of time after $t_1$:
  (i) sending a predetermined portion of the stored recorded data to a second storage device located remotely from said recording device; and
  (ii) erasing the predetermined portion of the stored recorded data from the first storage device;
 (d) receiving at an authentication server a data retrieval request from a non-remote user's device for retrieving a first segment of the recorded data, wherein the data retrieval request includes authentication information for the non-remote user;
 (e) authenticating the non-remote user based on the authentication information;
 (f) forwarding the data retrieval request to a first server;
 (g) processing the data retrieval request at said first server;
 (h) determining if the first segment of the recorded data is stored at said first storage device or at said second storage device;
 (i) forwarding the first segment of the recorded data to said first server;
 (j) processing the first segment of the recorded data at said first server wherein said processing includes sequencing the first segment of the recorded data in chronological order; and
 (k) sending the first segment of the recorded data in the determined format from the interface server to the remote user's device.

20. The method of claim 19 wherein the step of determining if the first segment of the recorded data is stored at said first storage device or at said second storage device is based at least in part on comparing a time stamp associated with said first segment of the recorded data with time $t_2$.

21. The method of claim 19 wherein the recorded data is selected from the group consisting of: video data, audio data, infrared data, proximity sensor data, ingress and/or egress sensor data, and combinations thereof.

22. The method of claim 19 wherein the recorded data comprises a first portion of data associated with a time frame TF1 and a second portion of data associated with a time frame TF2, wherein at least a portion of TF2 overlaps TF1 in time.

23. The method of claim 22 wherein the second portion of data is associated with a trigger event.

24. The method of claim 22 wherein the predetermined portion of the stored recorded data is the first portion of data.

25. The method of claim 22 wherein the predetermined portion of the stored recorded data is the first portion of data exclusive of the second portion of data.

26. The method of claim 25 wherein the second portion of data is associated with a trigger event.

27. The method of claim 22 wherein the recorded data is selected from the group consisting of: video data, audio data, infrared data, proximity sensor data, ingress and/or egress sensor data, and combinations thereof.

* * * * *